(12) United States Patent
Purnadi et al.

(10) Patent No.: US 6,937,605 B2
(45) Date of Patent: Aug. 30, 2005

(54) WIRELESS GATEWAY, AND ASSOCIATED METHOD, FOR A PACKET RADIO COMMUNICATION SYSTEM

(75) Inventors: Rene Purnadi, Coppell, TX (US); Yousuf Saifullah, Flower Mound, TX (US)

(73) Assignee: Nokia Corporation, Espoo (FI)

( * ) Notice: Subject to any disclaimer, the term of this patent is extended or adjusted under 35 U.S.C. 154(b) by 416 days.

(21) Appl. No.: 10/152,882

(22) Filed: May 21, 2002

(65) Prior Publication Data

US 2003/0219024 A1 Nov. 27, 2003

(51) Int. Cl.[7] .............................................. H04L 12/28
(52) U.S. Cl. ................................. 370/401; 370/395.5
(58) Field of Search ................................ 370/310, 320, 370/328, 335, 338, 342, 386, 389, 401, 402, 400, 395.5, 310.2, 321, 331, 441, 442, 467, 466, 469; 709/311, 220

(56) References Cited

U.S. PATENT DOCUMENTS 6,320,873 B1 * 11/2001 Nevo et al. ................. 370/466

* cited by examiner

*Primary Examiner*—Wellington Chin
*Assistant Examiner*—Brenda Pham
(74) *Attorney, Agent, or Firm*—Federico Fraccaroli

(57) ABSTRACT

Apparatus, and an associated method, for a 3G, cellular communication system having an access network and a core network. The access network is operable pursuant to the cdma2000 the operational specification, and the core network is operable pursuant to the 3GPP architecture using GPRS. A wireless gateway that provides an interworking functionality is provided to permit to the access network to utilize GPRS as a transport layer through which to transport packet-formatted data, thereby to effectuate, for example, multimedia applications over IP.

17 Claims, 7 Drawing Sheets

WIRELESS GATEWAY, AND ASSOCIATED METHOD, FOR A PACKET RADIO COMMUNICATION SYSTEM

The present invention relates generally to a manner by which to facilitate packet communications with a mobile node in a packet radio communication system. The packet radio communication system has separate parts operable pursuant to separate protocols, such as a first part operable pursuant to a cdma2000 protocol and a second part operable pursuant to a GPRS (General Packet Radio Service) protocol of a 3GPP architecture. More particularly, the present invention relates to a wireless gateway (WGW), or other interworking functions, and an associated method, that facilitates registration of, and handoff of, the mobile node. Operation of the wireless gateway permits, e.g., packet data service to be provided in the cdma2000 part of the packet radio communication system while utilizing a GPRS transport layer by which to transport the data.

BACKGROUND OF THE INVENTION

The use of wireless communication systems through which to communicate telephonically has become an endemic part of modern society. As wireline connections are not required to effectuate telephonic communications in a wireless communication system, communication by way of the wireless communication system is possible when formation of a wireline connection of a conventional, wireline communication system would be inconvenient or unfeasible. A cellular communication system, for instance, is exemplary of a wireless communication system. Cellular communication networks, forming the fixed infrastructure of cellular communication systems, have been installed throughout significant portions of the world. The fixed infrastructure of the cellular communication networks include fixed-site radio transceivers, referred to as base transceiver stations, capable of effectuating radio communications with mobile stations positioned in the vicinities thereof.

A user of a mobile station is permitted access to a cellular communication network to communicate therethrough by way of a service subscription. That is to say, a subscriber subscribes to service in a cellular communication system to permit the user to utilize the mobile station to communicate by way of a cellular communication network. Early implementations of cellular communication system utilized analog communication techniques. Advancements in digital communication techniques, as well as electronic circuitry through which to implement the digital communication techniques, has permitted successor-generations of cellular communication systems to utilize digital communication techniques. Generally, when digital communication techniques are utilized, data that is to be communicated is digitized, and sometimes also formatted, such as into data packets (the digital communication is not necessarily only formatted into packet data) pursuant to a formatting protocol. The digital data, or data packets formed thereof, can be communicated at discrete intervals during a communication session. Processing circuitry is utilized to act upon the data, prior to its transmission and also subsequent to its reception.

Various different types of digital cellular communication systems have been proposed and implemented. Existing digital communication systems are generally categorized by the access scheme pursuant to which they are operable. Two types of separate, and sometimes competing, communication schemes have achieved significant levels of implementation and usage. A first of such systems utilizes time-division, multiple-access techniques, and a second of such systems utilizes code-division, multiple-access techniques.

In a time-division, multiple-access communication technique, communication channels are defined by unique spreading codes by which digital data is encoded prior to its communication upon a frequency bandwidth.

Successor-generation, cellular communication systems are under development, intended to permit communication access of mobile stations independent of their technology-type of implementation. One successor-generation, communication system that utilizes code-division techniques is referred to as a cdma2000 system. And, another successor-generation, communication system is referred to as a 3GPP system. Packet radio communications are provided in the 3GPP system pursuant to a GPRS (General Packet Radio Service). GPRS can be used for both code division (UMTS) and time division (GERAN).

A 3GPP R00 PS R5 architecture set forth pursuant to the 3GPP communication system that utilizes GPRS provides for communication capabilities that permit effectuation of multimedia communication services. The multimedia services utilize IP (Internet Protocol)-formatted data, and the GPRS forms the transport layer by which to transport the IP-formatted data to effectuate the communication service. Corresponding functionality for a cdma2000 system does not presently appear to be capable of effectuating the same data-rich communication services.

As third-generation communication systems are being developed to permit separate access networks to be connected to a common core network, access networks instructed to be operable pursuant to different communication standards, such as the aforementioned cdma2000 and 3GPP/GPRS architectures, a possibility exists for interworking functionalities between the separate access networks operable pursuant to separate communication standards. If an interworking functionality were provided, the already-proven operability of GPRS in a 3GPP architecture could be utilized to facilitate the effectuation of a packet-based communication service in an access network that utilizes a cdma2000 communication scheme.

Such an interworking functionality would need to be capable of interfacing with both types of networks. And, preferably, changes to existing signaling set forth in the signaling protocols associated with the respective networks would be minimal.

An interworking functionality would therefore advantageously facilitate effectuation of communication services in a third-generation, packet-radio communication system.

It is in light of this background information related to packet radio communications that the significant improvements of the present invention have evolved.

SUMMARY OF THE INVENTION

The present invention, accordingly, advantageously provides an interworking functionality, and an associated method, that facilitates packet communications with a mobile node in a packet radio communication system.

The interworking functionality provides interworking functions for separate parts of the packet radio communication system. The separate parts are operable pursuant to separate protocols, such as a first part operable pursuant to a cdma2000 protocol, and a second part operable pursuant to a 3GPP/GPRS protocol.

Through operation of an embodiment of the present invention, a manner is provided to facilitate registration, and handoff, of the mobile node. Operation permits, e.g., packet data service to be provided in a cdma2000 part of the packet radio communication system while utilizing a GPRS transport layer by which to transport the data. The packet-transport capability of a 3GPP/GPRS part of the packet radio communication system is utilized to provide packet-radio service to a mobile node operable pursuant to a cdma2000 protocol.

In one aspect of the present invention, a wireless gateway provides the interworking functionality to facilitate effectuation of packet communications with a mobile node that is operable pursuant to a cdma2000, or other, communication scheme. The 3GPP/GPRS transport layer is used to transport packet-formatted data to and from the mobile node operable in the cdma2000 system.

The wireless gateway is positioned to detect messages generated during communication operations of the communication system. And, more particularly, the wireless gateway is positioned to detect A11-registration request messages generated by the PCF. There is a MIPv4 Registration Request message that is sent by the mobile node to the home agent that is transparent to the WGW. An A11-registration request message is generated while the mobile node is powered during initial powering-up of the mobile node, and pursuant to handoff procedures.

When the mobile node operates pursuant to cdma2000 protocols, IOS A11 signaling protocols are used. A11-Registration request messages include vendor-specific extensions, values of which, when detected by the wireless gateway, cause the wireless gateway to initiate a GPRS attach procedure or GPRS Routing Area Update. The registration request includes srcPZI, P-TMSI, and P-TMSI signature values, all defined in the 3GPP/GPRS system. Such values are set to null values and detection of such null values causes the wireless gateway to initiate the GPRS attach procedure. The A11-registration request message is also generated pursuant to handoff procedures. Handoff procedures can be dormant handoff procedures or hard handoff procedures. Dormant handoff procedures refer, for instance, to handoff procedures in the absence of an ongoing communication session. And, hard handoff procedures pertain, for instance, to handoff procedures that are performed while a communication session is ongoing. During dormant handoff procedures, the srcPZI, P-TMSI and P-TMSI signature values, indicated in the vendor-specific extension, are set to null values. Detection of such null values in the corresponding field of the registration request message causes the wireless gateway to initiate a GPRS attach procedure. Conversely, during hard handoff procedures, the values of the srzPZI, P-TMSI and P-TMSI signatures are set to be non-null values.

In another implementation, a modified IOS A1 assignment request, or handoff request, as appropriate, message is generated and, once generated, the message is inserted into an IOS A11 registration request message under a vendor-specific extension. And, the wireless gateway further operates to solicit information about the mobile node from which the request message originates with neighboring wireless gateways based on the srcPZI. Multicasting of the solicitation for the additional information is performed if srzPZI is not included, has a value that is not recognized as a neighboring srcPZI or has a null value, if necessary.

Signaling is provided, thereby, to permit the interworking functionality provided by the wireless gateway to transport packet data with a mobile node operable pursuant to a cdma2000 protocol while using the transport layer of a 3GPP/GPRS system. The already-proven performance capabilities of the 3GPP/GPRS system are thereby provided to the mobile node of the cdma2000 system.

In these and other aspects, therefore, apparatus, and an associated method, is provided for a packet radio communication system. The packet radio communication system has a first part operable pursuant to a first packet radio communication scheme having a first protocol and also a second part operable pursuant to a second packet radio communication scheme. Communication of packet-formatted data with a mobile node operable pursuant to the second packet radio communication scheme, while utilizing the first protocol, is facilitated. A gateway is coupled to both the first part and to the second part to receive messages generated selectably at the first part and selectably at the second part. The gateway selectably initiates an attach procedure defined pursuant to the first protocol responsive to selected messages received thereat. The attach procedure, once completed, permits routing of packet-formatted data, formatted pursuant to the first protocol with the mobile station.

A more complete appreciation of the present invention and the scope thereof can be obtained form the accompanying drawings that are briefly summarized below, the following detailed description of the presently-preferred embodiments of the invention, and the appended claims.

DETAILED DESCRIPTION

Figure 1:
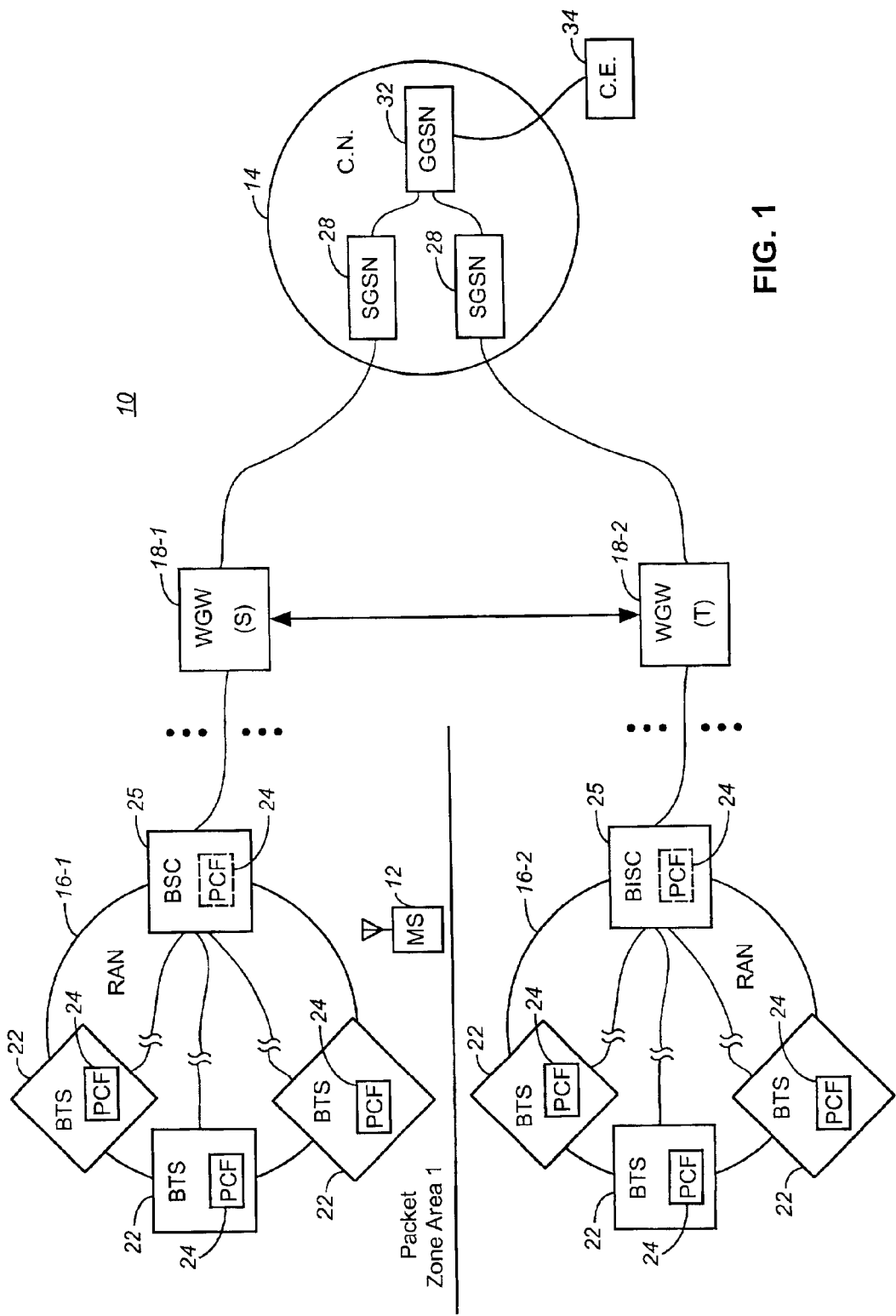
FIG. 1 illustrates a functional block diagram of a communication system in which an embodiment of the present invention is operable.

Referring first to FIG. 1, a communication system, shown generally at 10, provides for radio communications with mobile stations, of which the mobile station 12 is exemplary. In the exemplary implementation, the communication system forms a third-generation, cellular communication system having a core network 14 and access networks 16, here 16-1 and 16-2. The core network is formed of a 3GPP architecture that utilizes GPRS (General Packet Radio Service). The core network is operable pursuant to an appropriate GSM (Global System for Mobile Communications) operational standard specification that provides for GPRS. And, the access networks 16 are operable pursuant to a cdma2000 operational standard specification.

The access networks 16 are coupled to the core network by way of wireless gateways 18 that are operable pursuant to an embodiment of the present invention by which to permit GPRS to be utilized as a transport layer by which to effectuate communication services, such as real-time multimedia applications over IP (Internet Protocol), with a mobile station 12 that otherwise is operable pursuant to the cdma2000 operational standard specification.

Through utilization of the GPRS as the transport layer, the access networks, operable pursuant to the cdma2000 operational standard specifications, are able to send and to receive packet-formatted data pursuant to a protocol proven to be capable of effectively communicating the packet data in a real-time application.

The access networks each include a plurality of base stations 22, operable pursuant to the operational standard set forth in the cdma2000 operational standard. The access networks are here also shown to include packet control functions 24, functional entities defined in the cdma2000 operational standard specification. The PCFs are embodied, for instance at the base stations 22, at base station controllers (MSCs) 25, or distributed therebetween. The base stations of the access network 16-2 together define a packet zone area, here identified as a packet zone area 1. And, the base stations of the access network 16-1 define cells that together also form a packet zone area, here identified as the packet zone area 2.

Handovers of communications are performed when a mobile station travels between cells defined by separate ones of the base stations of a single one of the access networks. Handovers are also performed between base stations of the separate access networks when the mobile station exits the packet zone area 1 and enters the packet zone area 2. Operation of an embodiment of the present invention permits GPRS to be utilized as the transport layer through which to transport packet-formatted data irrespective of the positioning, and movement, of the mobile station.

The access network 16-1 is connected, by way of the wireless gateway 18, here designated at 18-1, to an SGSN (Serving GPRS Service Node) 28 of the core network. Analogously, the access network 16-2 is connected to the SGSN by way of the wireless gateway 18, here designated at 18-2. The core network, constructed to be operable pursuant to a 3GPP R00 PS R5 architecture, also includes a GGSN (Gateway GPRS Service Node) 32 to which the SGSN is coupled, in conventional manner. And, a correspondent entity 34 is also shown to be coupled to the core network 14. The corresponding entity is representative of any node capable of communicating packet-formatted, or other, data with the mobile station. Here, for instance, the corresponding entity is representative of a computer server at which multimedia data is sourced.

The wireless gateways form interworking functions that are connected to the PCF 24 using A11/A11 protocols and to the SGSN 28 using Iu-ps protocols. During operation of the wireless gateways, the gateways are triggered to execute registration, idle handoff, and active handoff procedures for the mobile station 12.

A cdma2000 system, the system pursuant to which the access networks 16 are operable, defines packet zones and packet zone identifiers (PZIs). And, the core network, operable pursuant to the 3GPP GPRS standard, utilizes routing areas and routing area identifiers (RAIs). And, in GPRS, P-TMSI and P-TMSI signatures are defined. Such values are required in a routing area update procedure and are further, optionally, utilized in attach procedures. The wireless gateways 18 operate to use the old, or source PZI (srcPZI) values to associate with the old RAI value. The wireless gateways also are selectably able to obtain the P-TMSI and P-TMSI signature values of the mobile node 12. The wireless gateways use information obtained from the access networks to initiate a registration, a dormant handoff, or an active hard handoff.

In a first embodiment of the present invention, srcPZI, P-TMSI, and P-TMSI signature values are obtained from the old/source BSC/PCF. Modification is made to the IOS A1-interface. The P-TMSI and P-TMSI signature values are carried over a handoff required message. And, the srcPZI, P-TMSI, and P-TMSI signature values are carried over the handoff request messages. Then, such values are inserted into the IOS A11 registration request and registration reply messages under vendor-specific extensions.

In the first embodiment, in the cdma2000 registration/GPRS attach cases, the srcPZI, P-TMSI, and P-TMSI signature values in the IOS A11 registration request, vendor-specific extension are set to be of null values. This triggers the wireless gateway to initiate a GPRS attach procedure.

When a dormant handoff is to be performed, the srcPZI, P-TMSI, and the P-TMSI signature values in the IOS A11 registration request, vendor-specific extension are also set to be of null values. When delivered to the wireless gateway, the gateway is triggered to initiate the GPRS attach procedure. And, in this embodiment, when hard-handoff is to be effectuated, the P-TMSI and P-TMSI signature values are carried over a modified, IOS A1 handoff required message. A mobile switching center adds the srcPZI value beside the P-TMSI and P-TMSI signature values in a modified, IOS A1 handoff request message. The non-null values are of the srcPZI, P-TMSI, and P-TMSI signature values in the IOS A11 registration request, vendor-specific extension field thereof, triggers the wireless gateway to initiate a GPRS routing area update (RAU) procedure. In the event of an inter-MSC, hard-handoff, a source MSC provides the srcPZI value to the target MSC prior to forwarding of the srcPZI value to the target wireless gateway by way of a modified IOS A1 handoff request message.

Each wireless gateway 18 maintains a list of the neighboring PZI values and maintains an association between the neighboring PZI values and the neighboring RAI values. The wireless gateway makes use of this association to obtain the old RAI from the received srcPZI.

Another embodiment of the present invention, utilizing only minimal changes in the IOS-A1 interface, utilizes a modified IOS A1 assignment request message and a modified IOS A1 handoff request message. In this case the P-TMSI and P-TMSI Signature is not stored in the old/source BSC/PCF. The PZI value is carried over such modified messages and are inserted into the IOS A11 registration request message under a vendor-specific extension field. The wireless gateway 18 solicits neighboring wireless gateways, based on the PZI value, for more information about the mobile node 12. A target wireless gateway 18, in one implementation, multicasts the solicitation if the PZI value is null or not recognized.

In this embodiment, pursuant to a cdma2000 registration/ GPRS attach procedure, a mobile switching center sends a null-valued srcPZI value in the modified IOS A1 assignment request message. The null-valued srcPZI value triggers the wireless gateway that receives the message to solicit more information from the neighboring wireless gateways area if none of the neighboring wireless gateways is able to provide a valid srcPZI, P-TMSI, and P-TMSI signature values of the mobile node, the wireless gateway initiates the GPRS attach procedure. Otherwise, an inter-MSC dormant handoff procedure is performed, and the wireless gateway initiates GPRS routing area update procedures to be effectuated.

In dormant handoff procedures, the mobile switching center sets the value of the srcPZI in the modified IOS A1 assignment request message to be a valid, i.e., non-null, value. Detection of such value triggers the wireless gateway to unicastly solicit more information from a previously-used wireless gateway, indicated by the srcPZI, and then to initiate a GPRS routing area update procedure. Otherwise, if the srcPZI is null or the value is not recognized as the value of a neighboring PZI, such a value triggers the wireless gateway to multicastly solicit for more information from the previous wireless gateway. If none of the neighboring wireless gateways has the information about the mobile node, an inter-MSC, dormant handoff procedure is followed, and the wireless gateway initiates GPRS Attach procedures.

In a hard handoff procedure, the mobile switching center sets the value of the srcPZI in the modified IOS A1 handoff request message to a valid, i.e., non-null value. This value triggers the wireless gateway to solicit more information from the previous gateway and then to initiate the GPRS routing area update procedure. When an inter-MSC hard handoff is to be performed, the source mobile switching center provides the srcPZI value to the target MSC before the srcPZI is forwarded to the target wireless gateway by way of the target BSC/PCF. Each wireless gateway maintains a listing of the neighboring PZI values and maintains the association between the neighboring PZI and the neighboring RAI. The wireless gateway uses this association to obtain the old RAI value from the received value of the srcPZI.

Figure 2:
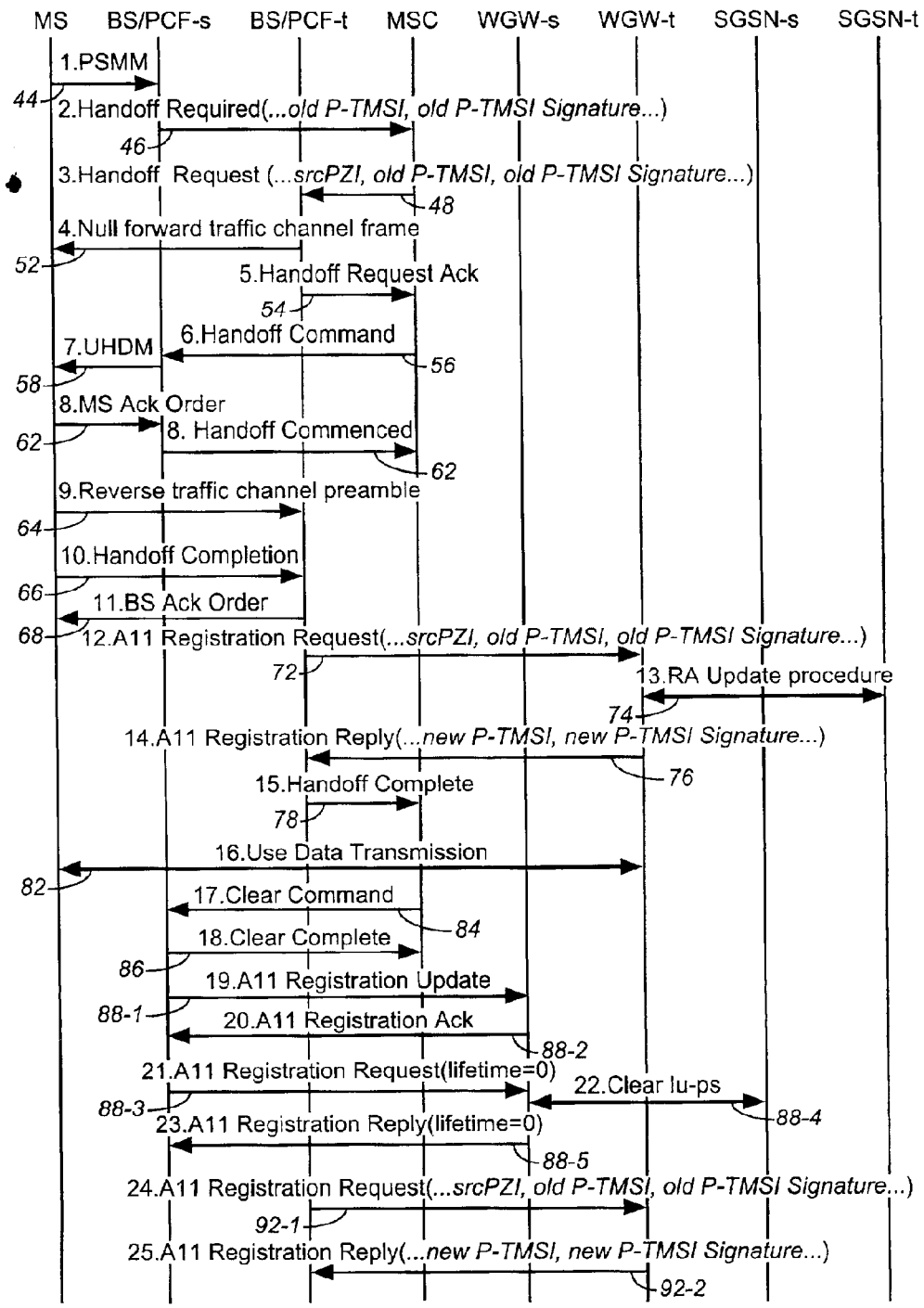
FIG. 2 illustrates a message sequence diagram representing signaling generated during operation of the communication system shown in FIG. 1 pursuant to an embodiment of the present invention in which hard handoff is performed between wireless gateways of the communication system.

FIG. 2 illustrates a message sequence diagram, shown generally at 42 representative of signaling generated during an inter-wireless gateway hard handoff procedure, here between the wireless gateways 18-1 and 18-2. First, and as indicated by the segment 44, subsequent to completion of pilot strength measurement, mobile node 12 generates a PSMM (Pilot Strength Measurement Message) to the source base station/PCF 22/24. Then, and as indicated by the segment 46, upon decision of the BS/PCF that handoff is imminent, a handoff required message, pursuant to IOS-A1, is generated that includes a list of target cells. The message includes the old P-TMSI value and the old P-TMSI signature value that has been allocated by the core network (GPRS) to the mobile node during the cdma2000 registration/GPRS attach procedure, and transmitted to the BS/PCF over the modified registration reply message. Alternatively, the PTMSI value and the P-TMSI signature value can be stored at the MSC. Additional modifications in the assignment complete message would be required to carry this parameter. And, modification would be required to the MSC to store the P-TMSI signature value. Modifications to the IOS-A1 handoff required message would, however, not need to be modified.

The segment 48 is representative of generation, and sending, by the MSC of a handoff request message to the target BS/PCF of the access network 16-2. Based upon the topography, the MSC is aware of the PZ (Packet Zone) of the source cell. In the handoff request message indicated by the segment 48, the MSC adds the source cell PZI (srcPZI) value and forwards the old P-TMSI and old P-TMSI signature values to the BS/PCF. A BS/PCF allocates the requested resources and starts sending, indicated by the segment 52, the null forward traffic channel frame (cdma2000).

The BS/PCF also replies, indicated by the segment 54, with (IOS-A1) handoff request acknowledgment message. Then, and as indicated by the segment 56, the MSC sends (IOS-A1) handoff command message to the BS/PCF. And, as indicated by the segment 58, the BS/PCF sends the (cdma2000 ) UHDM (Universal Handoff Direction Message) message to the mobile node.

The mobile node acknowledges, as indicated by the segment 62, receipt of the message with (cdma2000 MS) an ACK order message. And, the mobile station starts sending, as indicated by the segment 64, the reverse traffic channel preamble or data. And, the mobile node sends, as indicated by the segment 66, (cdma2000) a handoff completion message to the BS/PCF. The BS/PCF acknowledges, indicated by the segment 68, the receipt of the message with a cdma2000 BSACK order message.

The BS/PCF also initiates, indicated by the segment 72, the (IOS A10/A11) connection to the target wireless gateway 18-2. This message includes the srcPZI, old P-TMSI, and old P-TMSI signature values. The wireless gateway 18-2 analyzes values of the srcPZI value and maps the srcPZI value to the old RAI. Then, the wireless gateway initiates, indicated by the segment 74, the RA (Routing Area) update procedure. The target SGSN (SGSN-t) retrieves the GMM context from the source SGSN (SGSN-s) without any modification.

Then, and as indicated by the segment 76, if the RA update procedure is successful, the wireless gateway 18-1 sends (IOS-A11) a registration reply message to the BS/PCF. This message may include the new P-TMSI and P-TMSI signature values to replace the old P-TMSI and P-TMSI signature values. And, as indicated by the segment 78, the BS/PCF sends (IOS-A1) a handoff complete message to the MSC. And, as indicated by the segment 82, the user data is transferred over the BS/PCF, wireless gateway, and SGSN of the target network. The MSC also, as indicated by the segment 84, issues (IOS-A1) a clear command message for communication to the BS/PCF-source. The BS/PCF-source replies, as indicated by the segment 86, with (IOS-A1) a clear complete message and deletes the old P-TMSI and P-TMSI signature values together with other records. Segments 88-1 through 88-5 represent signaling generated to tear down the IOS-A10/A11 interface, followed by clearing up of the Iu-ps connection. And, the segments 92-1 and 92-2 are representative of signaling generated by which the BS/PCF-target updates the IOS A10/A11 interface to the wireless gateway before a lifetime expiration.

Analysis of the sequence diagram indicates that modification of the cdma2000 registration procedure in that the IOS-A11 registration reply message also carries the P-TMSI and P-TMSI signature value to the BS/PCF.

Figure 3:
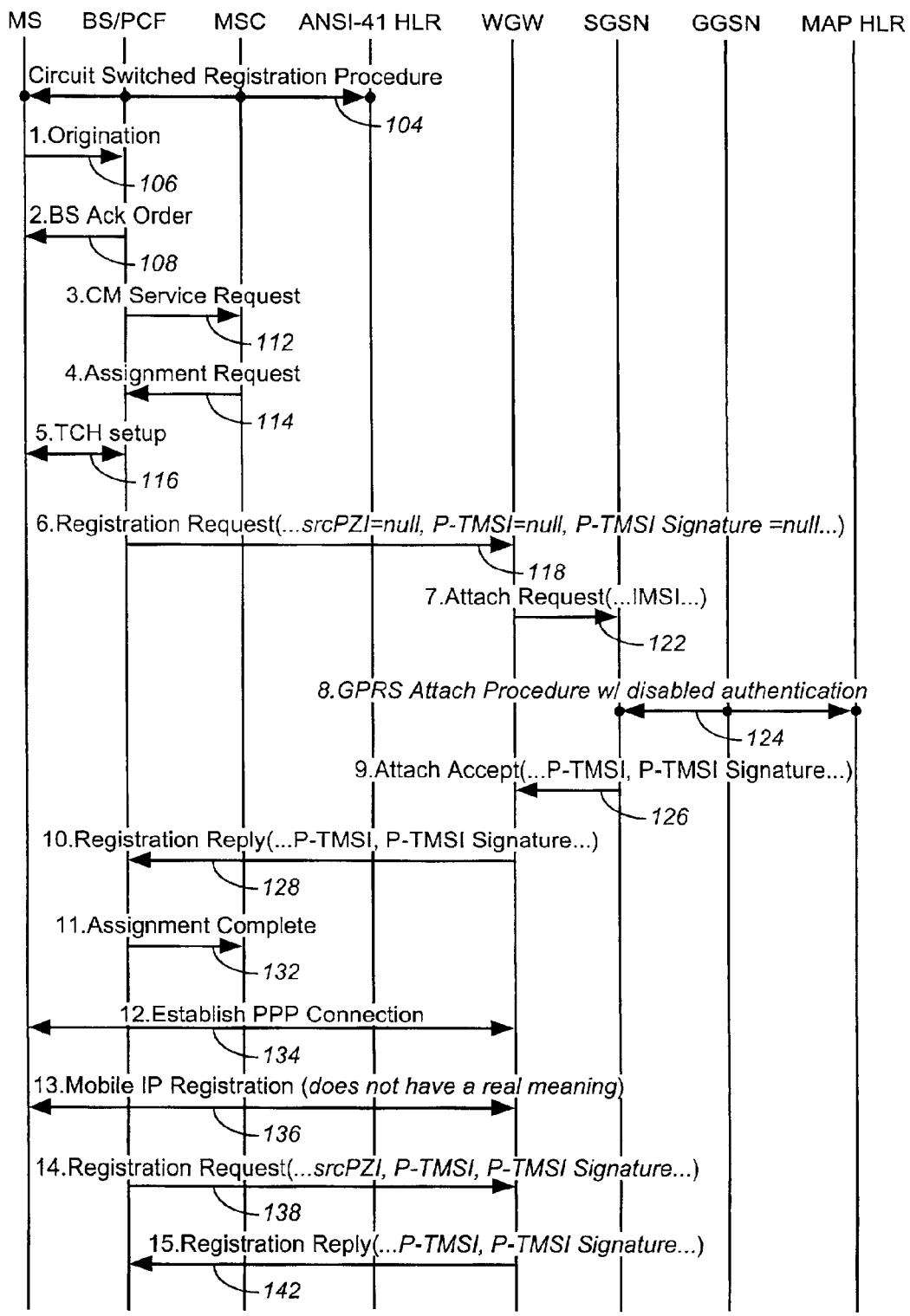
FIG. 3 illustrates a message sequence diagram representing signaling generated during operation of the communication system shown in FIG. 1 pursuant to registration/attach procedures effectuated pursuant to an embodiment of the present invention.

FIG. 3 illustrates a message sequence diagram, shown generally at 102, further signaling generated during operation of the communication system 10. Here, the mobile node performs the circuit-switched registration procedure. The procedures do not involve packet switching, and the procedure is indicated by the segment 104.

The segment 106 is representative of packet-switched registration initiation with a (cdma2000) origination message. For a registration procedure, the DRS (Data Ready to Send) is set to a logical zero value (no data to send). The IMSI in the origination message holds the PTMSI memory in the BS/PCF. Then, and as indicated by the segment 108, the BS/PCF acknowledges receipt of the origination message within (cdma2000), a BS acknowledgement order message.

The BS/PCF also sends, indicated by the segment 112, a (IOS-A1) CM service request to the MSC. And, as indicated by the segment 114, the MSC sends (IOS-A1) and assignment request message to the BS/PCF. The BS/PCF then sets up, indicated by the segment 116, the cdma2000 TCH.

Upon completion of the TCH setup, the BS/PCF sends, indicated by the segment 118, a (IOS-A11) registration request message to the wireless gateway. The message has current srcPZI value, P-TMSI equals IMSI, and P-TMSI signature equals null. Then, and as indicated by the segment 122, the P-TMSI signature equals null value in the registration request message triggers the wireless gateway to initiate GPRS attach procedures. The wireless gateway sends (Iu-ps) an attach request message. And, as indicated by the segments 124, the GPRS attach procedure is executed without the authentication procedure (disabled). The attach procedure uses the IMSI option instead of the P-TMSI/P-TMSI signature option.

If the GPRS attach procedure is successful, and as indicated by the segment 126, the WGW receives (Iu-ps) an attach accept message with the assigned P-TMSI and P-TMSI signature values.

Then, and as indicated by the segment 128, the wireless gateway 18-1 generates and sends the (IOS-A11) registration reply message including the P-TMSI and P-TMSI signature values to the BS/PCF. The BS/PCF stores the P-TMSI and P-TMSI signature values in the memory for that particular user and the BS/PCF sends, indicated by the segment 132, the (IOS-A1) assignment complete message to the MSC. And, as indicated by the segment 134, the mobile node establishes a PPP connection to the wireless gateway. And, as indicated by the segment 136, the mobile node starts the mobile IPv for registration procedure. The procedure, however, exhibits less relevance as the mobile IP is taken over by the GPRS attach procedures.

Before registration expires, the BS/PCF sends, indicated by the segment 138, a (IOS-A11) registration request message to the wireless gateway with srcPZI equal null, and P-TMSI and P-TMSI signature values. And, as indicated by the segment 142, the wireless gateway replies with a (IOS-A11) registration reply message that selectively includes the new P-TMSI and new P-TMSI signature values.

Figure 4:
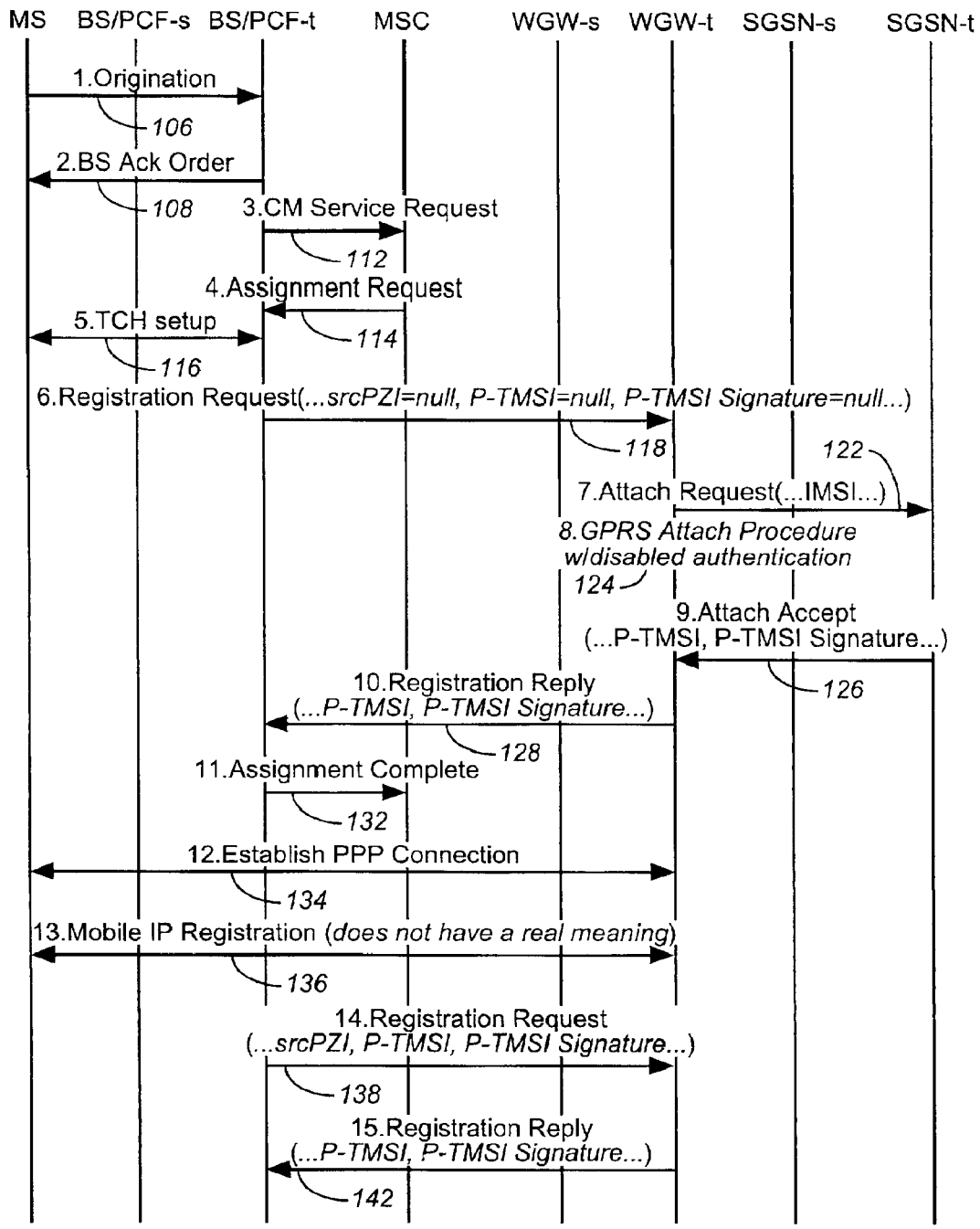
FIG. 4 also represents signaling generated during operation of the communication system shown in FIG. 1, here showing messaging generated during operation of an embodiment of the present invention by which to effectuate a dormant handoff.

FIG. 4 illustrates a message sequence diagram, shown generally at 152, also representative of signaling generated during operation of the communication system 10 shown in FIG. 1. Cell reselection, i.e., dormant handoff, procedures are represented. The procedures are similar to registration procedures. The ideal case is to relate to the cell reselection/dormant handoff with GPRS RA update procedures. But, the constraint that the air interface extending to the mobile node prohibits carrying of the srcPZI, old P-TMSI, and old P-TMSI signature values to the target wireless gateway that are needed for the RA update procedure.

Accordingly, the signaling generated during the cell reselection/dormant handoff procedures that form the message sequence diagram 152 correspond with analogous messages shown with respect to the message sequence diagram 102 illustrated in FIG. 3. Reference can be made to the description of the message sequence diagram 102 for the explanation of the corresponding messaging.

Figure 5:
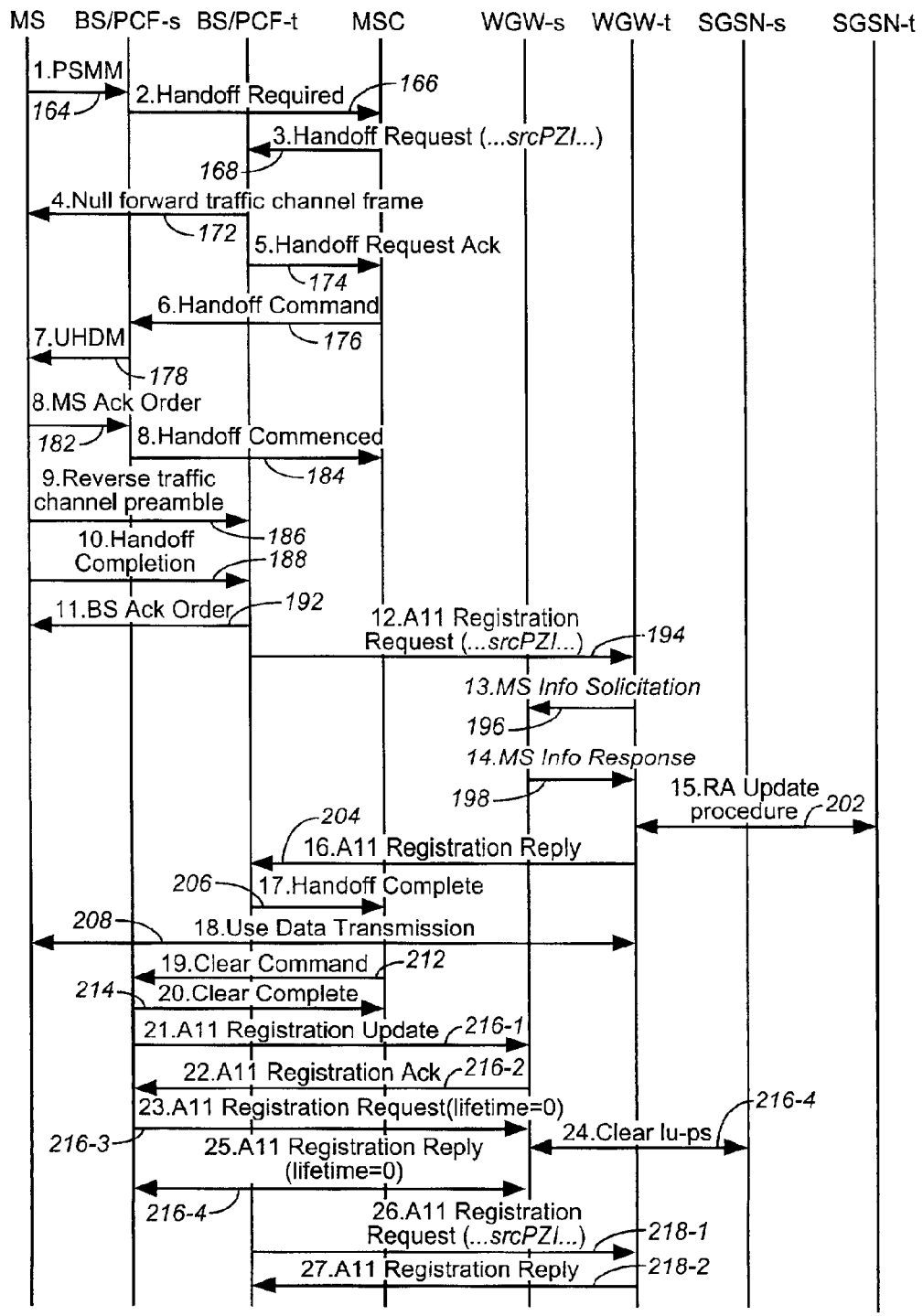
FIG. 5 also illustrates a message sequence diagram, here representative of signaling generated during operation of the communication system shown in FIG. 1, also pursuant to an embodiment of the present invention, hereto effectuate a hard handoff between wireless gateways.

FIG. 5 illustrates a message sequence diagram, shown generally at 162, also representative of signaling generated during operation of the communication system 10 shown in FIG. 1. Here, inter-wireless gateway, hard-handoff procedures effectuated pursuant to another embodiment of the present invention are represented. First, and as indicated by the segment 164, after finishing the pilot signal strength measurement, the mobile node sends the (cdma2000) PSMM (Pilot Strength Measurement Message) to the source BS/PCF. Then, and as indicated by the segment 166, the BS/PCF decides that a handoff is imminent and sends the (IOS-A1) handoff required message together with the list of target cells. And, as indicated by the segment 168, upon receiving the handoff required message, the mobile switching center sends the (IOS-A1) handoff request message to the target BS/PCF. Based upon the topography, the mobile switching center knows the PZI (Packet Zone ID) value of the source cell. In the handoff request message, the mobile switching center adds the source cell PZI (srcPZI).

Then, and as indicated by the segment 172, the BS/PCF allocates the requested resources and starts sending the (cdma2000) null forward traffic channel frame. And, as indicated by the segment 174, the target BS/PCF replies to the MSC with an (IOS-A1) handoff request acknowledgment. Thereafter, and as indicated by the segment 176, the MSC sends a (IOS-A1) handoff command message to the target BS/PCF. And, as indicated by the segment 178, the target BS/PCF sends a (cdma2000) UHDM (Universal Handoff Direction Message) to the mobile node.

The mobile node acknowledges, indicated by the segment 182, receipt of the message with a (cdma2000 MS) ACK order message. And, the mobile node starts sending, indicated by the segment 184, a (cdma2000) handoff completion message to the target BS/PCF.

The mobile node also sends, indicated by the segment 188, a (cdma2000) handoff completion message to the target BS/PCF. And, the BS/PCF acknowledges receipt of the message with a (cdma2000) BS acknowledgment order message, indicated by the segment 192.

The target wireless gateway analyzes the srcPZI value and maps the address of the source wireless gateway. Then, the target wireless gateway sends, indicated by the segment 196, a MS info solicitation message only to the source wireless gateway. And, the source wireless gateway responds with a MS info response message including the srcPZI, P-TMSI, and P-TMSI signature values. And, as indicated by the segment 202, upon receiving the MS info response message, the target wireless gateway initiates the RA (Routing Area) update procedure. The target SGSN (SGSN-t) retrieves the GMM and PDP contacts from the source SGSN (SGSN-s) without modification.

Thereafter, and as indicated by the segment 204, if the RA update procedure is successful, the target wireless gateway sends a (IOS-A11) registration reply message to the target BS/PCF. And, as indicated by the segment 206, the target BS/PCF sends a (IOS-A1) handoff complete message to the mobile switching center. Thereafter, and as indicated by the segment 208, the user data transmission starts and is transferred over the target BS/PCF, WGW, and SGSN.

The MSC issues, indicated by the segment 212, a (IOS-A1) clear command message to the source BS/PCF. And, as indicated by the segment 214, the source BS/PCF replies with a (IOS-A1) clear complete message. Thereafter, and as indicated by the segments 216-1 through 216-5, the source BS/PCF starts tearing down the IOS-A10/A11 interface that is followed by clearing up of the Iu-ps connection. And, as indicated by the segments 218-1 and 218-2, the target BS/PCF updates the IOS-A10/A11 interface to the target wireless gateway before the lifetime expiration. The current srcPZI value is used.

Figure 6:
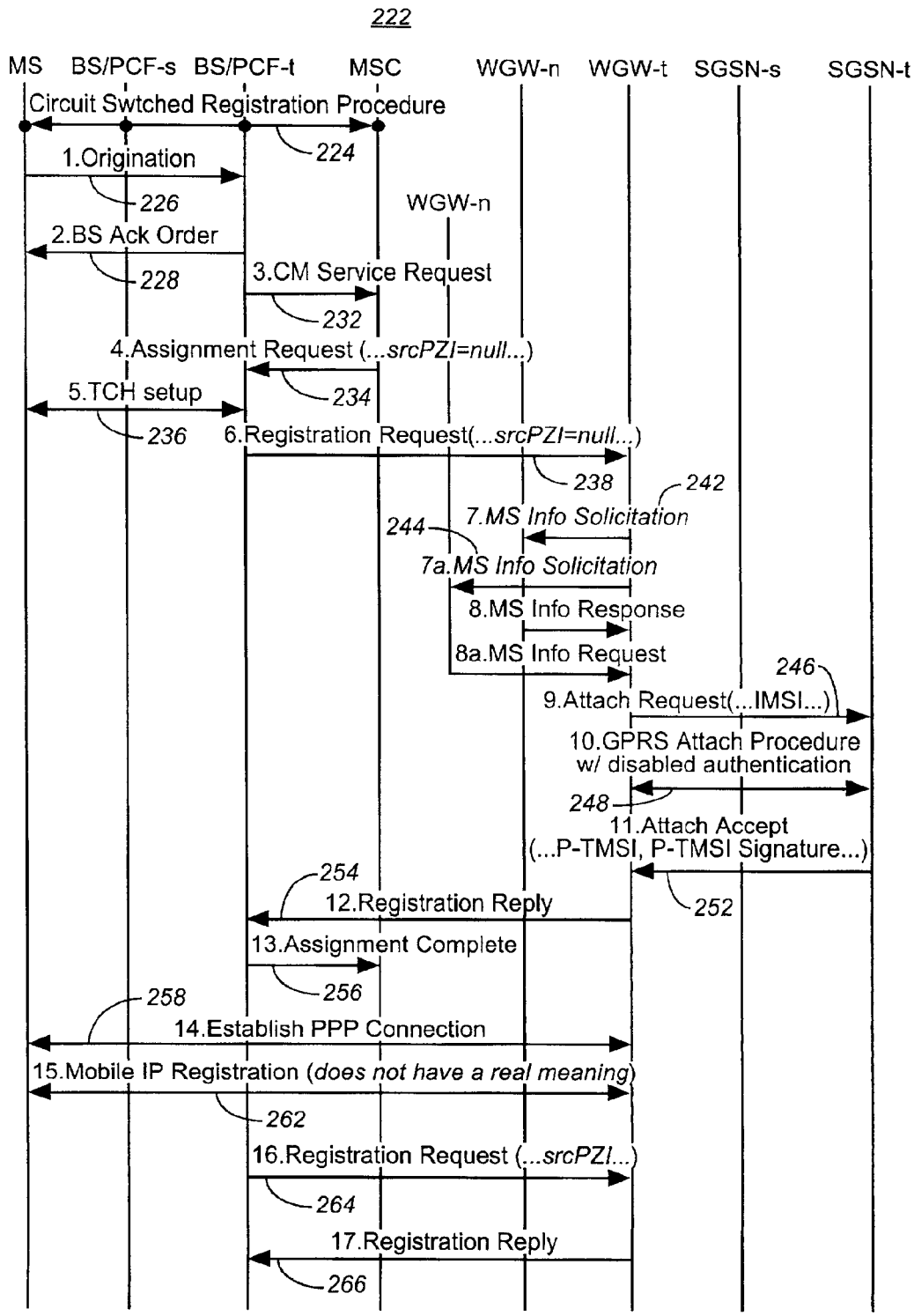
FIG. 6 also illustrates a message sequence diagram representative of signaling generated during operation of the communication system shown in FIG. 1, hereto perform a registration/attach procedure pursuant to an embodiment of the present invention. The mobile node information is obtained by multicasting the solicitation to the neighboring gateways.

FIG. 6 illustrates a message sequence diagram, shown generally at 222, also representative of signaling generated during operation of the communication system 10 shown in FIG. 1, hereto effectuate a cdma2000 registration/GPRS attach procedure.

The segment 224 is representative of the circuit/switch to registration procedure performed by the mobile node. The procedures do not involve packet-switching. Then, and as indicated by the segment 226, packet switching registration is initiated with an (cdma2000) origination message. For the registration procedure, the DRS (Data Ready to Send) is set to a logical zero value (i.e., no data to send). The IMSI in the origination message fills the P-TMSI memory of the BS/PCF.

Then, and as indicated by the segment 228, the BS/PCF acknowledges the receipt of the origination message with a (cdma2000) BSACK order message. And, the BS/PCF sends, indicated by the segment 232, a (IOS-A1) CM service request to the mobile switching center.

Upon receiving the CM service request, the MSC tries to find the PZI of that IMSI. In the case of initial registration or inter-MSC dormant handoff, there is no related PZI for the registering IMSI. Then the MSC sends, indicated by the segment 234, an (IOS-A1) assignment request message to the BS/PCF with srcPZI equalsnull. The BS/PCF sets up, indicated by the segment 236, the necessary cdma2000 TCH. Upon completion of the TCH setup, the BS/PCF sends, indicated by the segment 238, a (IOS-A11) registration request message to the wireless gateway with srcPZI equals null. And, upon receiving the (IOS-A11) registration request message and finding that the srcPZI equals null, the target wireless gateway multicasts the MS info request message, indicated by the segment 242, to neighboring wireless gateways (WGW-n). In the case of packet data initial registration, none of the neighboring wireless gateways is a source wireless gateway, so none reply with the MS info request message with srcPZI or old RAI (the WGW can map the srcPZI value into an old RAI value). In the event of a dormant handoff, one of the neighboring wireless gateways is the source wireless gateway, and the source wireless gateway replies with a MS info solicitation message with a srcPZI value or an old RAI value.

In this registration procedure, as none of the neighboring wireless gateways is a source wireless gateway, there is no wireless gateway that has the data of the mobile node. Each neighboring wireless gateway replies, indicated by the segment 244 with the srcPZI value indicating unknown.

When the target wireless gateway receives the MS info response message with the srcPZI value indicating unknown srcPZI value, or does not receive a response message within a timer expiration. The target wireless gateway initiates the GPRS attach procedure using IMSI. In the event in which the mobile node was detached somewhere, that is, is not in one of the neighboring wireless gateways, none of the neighboring wireless gateway has the srcPZI value nor the appropriate GMM context. Then it proceeds to the GPRS attach procedure. In the event in which the mobile node was detached in one of the neighboring wireless gateways and the GMM context had been erased, the neighboring wireless gateway will not be able to provide the srcPZI value nor the appropriate GMM context to the target wireless gateway. Then it proceeds to the GPRS attach procedure. In the situation in which the mobile node was detached from one of the neighboring wireless gateways and the GMM, and PDP, contexts have not been erased, the srcPZI in the mobile node info response message still has to be set to a value indicating unknown srcPZI so that the target wireless gateway can proceed with the GPRS attach procedures. The GMM context in the neighboring wireless gateway will be automatically deleted upon expiration, or will be eliminated through the GPRS purge procedure. Such procedures are indicated by the segment 246. And, the GPRS executes the attach procedure, indicated by the segment 248.

If the attach procedure is successful, the target SGSN sends an attach accept message, indicated by the segment 252, to the target wireless gateway together with the new P-TMSI and P-TMSI signature values. The target wireless gateway stores the P-TMSI and P-TMSI signature values. And, as indicated by the segment 254, the target wireless gateway sends the (IOS-A11) registration reply message. The BS/PCF establishes the relation between the IMSI of the registering mobile node and its own PZI value. This relation will be deleted when the GPRS is detached. Then, and as indicated by the segment 246, the BS/PCF sends the (IOS-A1) assignment complete message to the MSC. And, as indicated by the segment 258, the mobile node establishes a PPP connection to the target wireless gateway.

The mobile node continues with MIP registration, indicated by the segment 262. As the mobile IP mobility can be replaced by GPRS, this procedure is consumed in the target wireless gateway. Or, another level of mobility is introduced by introducing a foreign agent (FA) in the GGSN (ffs). Before expiration of the registration, the BS/PCF sends, indicated by the segment 264, a registration request message to the wireless gateway. The srcPZI value is set to the current one and, the wireless gateway replies, indicated by the segment 266, with a IOS-A11 registration reply message.

Figure 7:
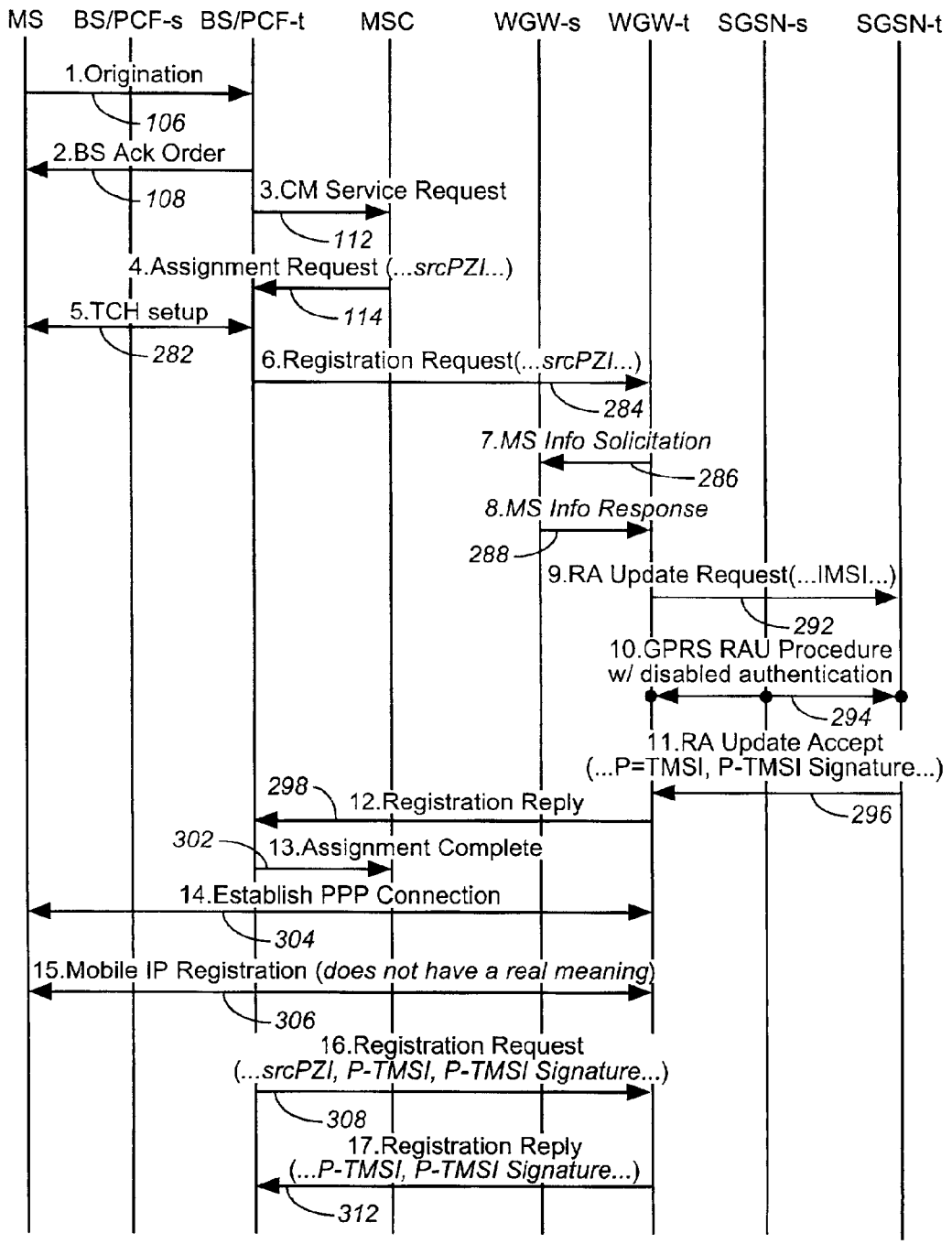
FIG. 7 illustrates another message sequence diagram, also representative of signaling generated during operation of an embodiment of the present invention, hereto effectuate a dormant handoff or packet data initial registration between base stations.

FIG. 7 illustrates another message sequence diagram, shown generally at 272, also representative of signaling generated during operation of the communication system 10 shown in FIG. 1. Here, cell reselection (dormant handoff) procedures pursuant to another embodiment of the present invention are represented. Segments 106, 108, 112, and 114 correspond to correspondingly-referenced segments shown and described with respect to the sequence diagram 152 shown in FIG. 4.

Here, upon receiving CM service requests, the mobile switching center tries to find a corresponding PZI of that IMSI. In the event of intra-MSC dormant handoff, there is a PZI for the registering of the IMSI. Then the MSC sends the IOS-A1 assignment request message to the BS/PCF with a non-null srcPZI value. In the event that the handoff involves different mobile switching centers, the target MSC will not have the corresponding PZI for the IMSI, and the IOS-A1 assignment request shall contain the null srcPZI value.

Then, and as indicated by the segment 284, the BS/PCF sets up the necessary cdma2000 TCH. And, upon completion of the TCH set up, as indicated by the segment 284, the BS/PCF sends a (IOS-A11) registration request message to the wireless gateway with non-null srcPZI values (intra MSC hard-handoff, or with null srcPZI values) (inter MSC hard-handoff). Upon receiving the IOS-A11 registration request, and if the srcPZI is non-null, the target wireless gateway analyzes the srcPZI and maps the addresses of the source wireless gateway. Then the target wireless gateway sends, indicated by the segment 286, a MS info solicitation message only to the source wireless gateway. If the srcPZI value is null, the target wireless gateway multicasts the MS info solicitation message to the neighboring wireless gateways. In the event of a dormant handoff, one of the neighbor wireless gateways is the source wireless gateway (WGWs). In the event of packet data initial registration, none of the neighboring wireless gateways is the source wireless gateway, so none of the source wireless gateways reply to the MS info request message with a real (non-null) srcPZI value.

The source wireless gateway replies, as indicated by the segment 288, with a MS info response message including the valid value of the srcPZI, the P-TMSI value, and the P-TMSI signature value.

When the target wireless gateway receives the MS info response from the source wireless gateway, it includes the srcPZI, P-TMSI, and P-TMSI signature values. Then, the target wireless gateway initiates the RA update request, indicated by the segment 292.

The GPRS executes the RA update procedure, as indicated by the segment 294. If the RA update procedures are successful, the target SGSN sends the RA updates accept messages to the target wireless gateway together with the new P-TMSI and P-TMSI signature values. The target wireless gateway stores the P-TMSI and the P-TMSI signature values, as indicated by the segment 296.

The target wireless gateway sends, indicated by the segment 298, the target wireless gateway sends the IOS-A11 registration reply message. The BS/PCF establishes the relation between the IMSI of the registering mobile station and its own PZI. The relation is deleted when the GPRS is detached.

The BS/PCF sends, indicated by the segment 302, an assignment complete message to the MSC. The MSC is aware of the serving PZI and makes a new relation between the IMSI and the PZI.

As indicated by segment 304, the mobile node establishes a new PPP connection with the target wireless gateway. And, as indicated by the segment 306, the mobile station continues with MIP registration. As the mobile IP mobility is replaced by GPRS, this procedure is consumed in the target wireless gateway. Or, another level of mobility is introduced by introducing a foreign agent (FA) in the GGSN (ffs).

Before expiration of the registration, the BS/PCF sends, as indicated by the segment 308, a registration request message to the wireless gateway. The srcPZI value is set to the current value. And, as indicated by the segment 312, the target wireless gateway replies with a IOS-A11 registration reply message.

Thereby, in one mode of operation more modification in the A1 (has to carry srcPZI, P-TMSI and P-TMSI Signature) is required and the BSC/PCF has to store P-TMSI and P-TMSI Signature and the MSC provides the srcPZI. The A11 Registration Request Vendor Specification Extension has to carry srcPZI, P-TMSI and P-TMSI Signature to the wirelss gateway and the A11 Registration Reply Vendor Specification Extension has to carry (new)P-TMSI and (new)P-TMSI Signature And, in the other exemplary mode of operation less modification in the A1 (has to carry srcPZI only), is required and the BSC/PCF does not store the P-TMSI and P-TMSI Signature but the wireless gateway store them. Similarly, the MSC provides the srcPZI. The wireless gateway has to solicit the P-TMSI and the P-TMSI Signature, and potentially other mobile node info, unicastly (if srcPZI is a valid non null value) or multicastly (if the srcPZI is null or the value is not recognized as the value of a neighboring wireless gateways). The result of either method initiates the wireless gateway to trigger GPRS attach procedure, if the old RAI cannot be retrieved, or GPRS routing area update, if the old RAI can be retrieved.

The previous descriptions are of preferred examples for implementing the invention, and the scope of the invention should not necessarily be limited by this description. The scope of the present invention is defined by the following claims.

What is claimed is:

1. Apparatus for a packet radio communication system having a first part operable pursuant to a first packet radio communication scheme having a first protocol and a second part operable pursuant to a second packet radio common scheme, the first part comprising a GPRS-based (General Packet Radio Service-based) network, the first protocol comprises a GPRS protocol, the second part comprising a cdma 2000-based network, and the second racket radio communication scheme comprising a cdma 2000-protocol that defines registration request messages and registration reply messages that each contain extension fields, said apparatus for facilitating communication of packet-formatted data with a mobile node operable pursuant to the second packet radio scheme while utilizing the first protocol, said apparatus comprising:

a gateway coupled to both the first part and to the second part to receive messages generated selectably at the first part and selectably at the second part, said gateway selectably for initiating a GPRS attach procedure defined pursuant to the first protocol responsive to detection by said gateway of selected values contained in the extension field of the registration request message, the attach procedure, once completed, permitting routing of packet-formatted data formatted pursuant to the first protocol with the mobile station.

2. The apparatus of claim 1 wherein the registration request is formatted pursuant to an IOS A11 specification defined for the cdma2000 protocol, wherein the registration request message detected by said gateway comprises an IOS A11 registration request and wherein the extension field thereof comprises a vendor-specified extension field, the selected values contained therein, when detected by said gateway, causing initiation of the GPRS attach procedure.

3. The apparatus of claim 2 wherein the selected values contained in the vendor-specific-extension field that detection of which causes the initiation of the GPRS attach procedure comprise null values.

4. The apparatus of claim 1 wherein the mobile node is operable pursuant to a cdma2000 protocol and wherein the messages to which said gateway is coupled to receive and responsive to which said gateway initiates the GPRS attach procedure comprises messages generated pursuant to the cdma2000 protocol, the messages generated pursuant to mobile node registration procedures.

5. The apparatus of claim 1 wherein the mobile node is operable pursuant to a cdma2000 protocol and wherein the messages to which said gateway is coupled to receive and responsive to which said gateway initiates the GPRS attach procedure comprises messages generated pursuant to the cdma2000 protocol, the messages generated pursuant to dormant handoff procedures.

6. The apparatus of claim 5 wherein the registration request the registration request message that contains an extension field that when detected by said gateway, selectably causes initiation of the GPRS attach procedure is generated by the mobile node.

7. The apparatus of claim 5 wherein the registration request is formatted pursuant to an IOS A11 specification defined for the cdma2000 protocol, wherein the registration request message detected by said gateway comprises an IOS A11 registration request and wherein the extension field thereof comprises a vendor-specific-extension field, the selected values contained therein, when detected by said gateway, causing initiation of the GPRS attach procedure.

8. A method for initiating a data related procedure in a packet radio communication system having a first part operable pursuant to a cdma2000 operating protocol and a second part operable pursuant to a GSM/GPRS operating protocol, and a mobile station operable pursuant to the cdma operating protocol, said method comprising:

generating an IOS A1 message at the mobile station for communication to the first part of the packet radio communication system;

providing indications of the IOS A1 message to an interworking function, functionally interconnecting the first and second parts, respectively, or the packet radio communication system; and utilizing the GSM/GPRS operating protocol as a transport layer to perform the GPRS data related procedure.

9. A method of communicating in a packet radio communication system having a first part operable pursuant to a first packet radio communication scheme having a first protocol and a second part operable pursuant to a second packet radio communication scheme, the first part comprising a GPRS-based (General Packet Radio Service-based) network, the first protocol comprising a GPRS protocol that defines a P-TMSI value and a P-TMSI signature, and the second part comprising a cdma2000 based network, said method for facilitating communication of packet-formatted data with a mobile node operable pursuant to the second packet radio scheme while utilizing the first protocol, said method comprising:

detecting, at a gateway coupled to both the first part and the second part, messages selectably generated at the first part and selectably generated at the second part; and selectably initiating a GPRS attach procedure defined pursuant to the first protocol responsive to selected messages received thereat, the GPRS attach procedure, once completed, permitting routing of packet-formatted data, formatted pursuant to the first protocol with the mobile station.

10. The method of claim 9 further comprising the operation of sending the messages to the gateway.

11. The method of claim 10 wherein the messages sent during said operation of sending comprise registration request messages defined pursuant to an IOS A11 specification for the cdma2000 protocol.

12. A method of communicating in a packet radio communication system having a first part operable pursuant to a first packet radio communication scheme having a first protocol and a second part operable pursuant to a second packet radio communication scheme, the first part comprising a GPRS-based (General Packet Radio Service-based) network, the first part comprising a GPRS protocol, the second part comprising a GPRS protocol, the second part comprising a cdma2000-based network, wherein the GPRS protocol defines a P-TMSI vaue and a P-TMSI signature, said method for facilitating communication of packet-formatted data with a mobile node operable pursuant to the second packet radio scheme while utilizing the first protocol, said method comprising:

detecting, at a gateway coupled to both the first part and the second part, messages selectably generated as the first part and selectably generated at the second part; and selectably initiating a GPRS routing area update procedure defined pursuant to the first protocol responsive to selected messages received thereat, the GPRS routing area update permitting of packet-formatted data, formatted pursuant to the first protocol with the mobile station.

13. Apparatus for a packet radio communication system having a first part operable pursuant to a first packet radio communication scheme having a first protocol and a second part operable pursuant to a second packet radio common scheme, the first part comprising a GPRS-based (General Packet Radio Service-based) network, the first protocol a GPRS protocol, the second part comprising a cdma-based network, and the mobile node operable pursuant to a cdma2000 protocol, said apparatus for facilitating communication of packet-formatted data with a mobile node operable pursuant to the second packet radio scheme while utilizing the first protocol, said apparatus comprising:

a gateway coupled to both the first part and to the second part to receive messages generated selectably at the first part and selectably at the second part, said gateway selectably for initiating a GPRS routing area update procedure defined pursuant to the first protocol responsive to selected messages received thereat, the selected messages forming cdma2000 protocol messages generated pursuant to active handoff procedures, GPRS routing area update procedure, once completed, permitted routing of packet-formatted data formatted pursuant to the first protocol with the mobile station.

14. The apparatus of claim 13 wherein the second packet radio communication scheme pursuant to which the cdma2000-based network is operable has a cdma2000-protocol that defines registration request messages and registration reply messages, the registration request messages and the registration reply messages each containing extension fields, selected values contained in an extension field of a registration request message generated by the mobile node, when detected by said gateway, causing initiation of the GPRS attach procedure.

15. The apparatus of claim 14 wherein the registration request is formatted pursuant to an IOS A11 specification defined for the cdma2000 protocol, wherein the registration request message detected by said gateway comprises an IOS A11 registration request and wherein the extension field thereof comprises a vendor-specific-extension field, the selected values contained therein, when detected by said gateway, causing initiation of the GPRS attach procedure.

16. The apparatus of claim 15 wherein the selected values contained in the vendor-specific-extension field that detection of which causes the initiation of the GPRS attach procedure comprise non-null values.

17. The apparatus of claim 15 wherein the IOS A11 registration request comprises a modified IOS A11 registration request, wherein the GPRS protocol further defines an srcPZI (source-PZI) value, and wherein the modified IOS A11 registration request further comprises values representative of the srcPZI value, said gateway, responsive to detection of the modified IOS A11 registration request, for initiating a GPRS Routing Area Update procedure.

* * * * *